3,555,584
DYEING HUMAN HAIR WITH (2'-HYDROXYETH-YL) - 1 - AMINO - 2 - NITRO - (2' - HYDROXYETH-YL)-4-METHYLAMINOBENZENE
Gregoire Kalopissis, Paris, and Andrée Bugaut, Boulogne-sur-Seine, France, assignors to Societe Anonyme dite: L'Oreal
No Drawing. Filed Nov. 18, 1965, Ser. No. 508,568
Claims priority, application Luxembourg, Nov. 19, 1964, 47,386
Int. Cl. A61k 7/12
U.S. Cl. 8—10.1               4 Claims

ABSTRACT OF THE DISCLOSURE

The invention relate to dyeing human hair with an aqueous composition containing (2'-hydroxyethyl)-1-amino-2-nitro-(2'-hydroxyethyl)-4-methylaminobenzene, preferably at room temperature.

---

Substituted nitroparaphenylenediamines are well known active ingredients of hair dyes, and particularly of dyes for human hair.

Among the different substituents proposed with a view to obtaining deeper shades than those obtained with nitroparaphenylenediamine itself are the alkyl groups and the hydroxyalkyl groups.

In particular it has been suggested that the trihydroxyalkylated derivatives of nitorparaphenylenediamine be used, and especially those trihydroxyethylated derivatives which have a hydroxyethyl radical on the amino group in the ortho position of the nitro group and two hydroxyethyl radicals on the amino group in the meta position of the nitro group.

However, it is very difficult to obtain a trihydroxyethylated derivative of the type in question from nitroparaphenylenediamine, by reaction with a halohydrin, for example, in a commercially adequate percentage of yield, without painstaking purification, because the substitution of the hydroxyethylated groups for the hydrogens of the amine functions leads in practice, not to a pure trihydroxyethylated product, but to a mixture of mono-, di-, and trisubstituted products, each having its own coloring power, said mixture often comprising also tarry impurities.

Under the operating conditions under which this substitution is carried out, the proportions in such a mixture vary, and the results obtained by using such a mixture cannot be consistently reproduced.

The object of the present invention is to provide a new dye and new coloring compositions based on said new dye.

The said new dye is: (2'-hydroxyethyl)-1-amino-2-nitro-(2'-hydroxyethyl)-4-methylaminobenzene.

The invention also relates to two processes of preparing this new dye.

The first method results in a mixture comprising a mixture of the product according to the invention which is di-hydroxyethylated in 1-4 position and a product which is monohydroxyethylated in position 4, while the amine function which occupies position 1 in the dye according to the invention remains unsubstituted. The process of separating the reaction products obtained by this process is long and difficult, but it is highly important that this separation be made, because the presence of the mono-hydroxymethylated product has a substantial effect on the shade produced and if a mixture of both these reaction products is used, the fact that the proportion between the products is dependent on the reaction conditions makes it impossible to obtain a perfectly reproducible shade. The use of this first method of preparation is therefore accompanied by definite inconveniences. This process has, however, been described, since the dye according to the invention may be produced in this manner. Said process is essentially characterized by the fact that a glycol halohydrin is reacted with 1-amino-2-nitro-4-methylaminobenzene, (a composition heretofore known in itself) and that the resulting mono and di-hydroxyethylated products are then separated.

The second process of preparing the dye according to the invention makes it possible to efficiently substitute a hydroxyethyl radical for a hydrogen of the amine function in the ortho position of the nitro group. This process is essentially characterized by the fact that 1-amino-2-nitro-4-methylacetaminobenzene is reacted with chloroethyl-chloroformiate to block the position occupied by one of the hydrogen atoms initially bonded to the nitrogen atom in position 1 and the fact that concentrated hydrochloric acid is used to deacetylate the product thereby obtained, after which potash is added to cause hydroxyethylation in position 1 and a glycol halohydrin is introduced to cause hydroxyethylation in position 4.

It has been found that the use of (2'-hydroxyethyl)-1-amino-2-nitro-(2'-hydroxyethyl)-4-methylaminobenzene produces perfectly uniform deep violet shades.

Moreover, this dye has an excellent affinity for the keratinic fibers of human hair and the colors produced thereby are particularly resistant to shampooing and have no coloring effect on the scalp.

The hair dyeing compositions containing this dye are simple aqueous solutions having preferably an alkaline pH. The pH of these solutions is generally between 7 and 10 and preferably between 8 and 9.5. Ammonia, or any organic base such as a monoalkylamine, an alkanolamine, or a heterocyclic amine may be used to adjust the pH.

Moreover, the dyeing solutions according to the invention may include various conventional ingredients such as, for example, organic solvents, detergents, and lacquers.

The dye according to the invention may also be mixed with other dyes such as nitrated dyes, azo dyes, anthraquinone dyes, or any other type of dye conventionally used to dye human hair.

In use, these dyes do not require the employment of an oxidizing agent. The time in contact with the air may vary within broad limits but falls preferably between 5 and 30 minutes. The temperature of application may also be varied, but the dye is preferably used at room temperature. The concentration of the dye according to the invention in the dyeing solutions based thereon may also be varied, but this concentration is preferably between 0.1% and 3%.

The two processes of preparing the dye according to the invention will now be described. It will be recalled that the first of these is more difficult to carry out than the second.

(1) FIRST PROCESS OF PREPARING (2'-HYDROXYETHYL) - 1 - AMINO - 2 - NITRO-(2'-HYDROXYETHYL)-4-METHYLAMINOBENZENE

A mixture containing 0.05 mols (8.35 g.) of 1-amino-2-nitro-4-methylaminobenzene, 65 cm.³ of water and 9.6 g. of calcium carbonate is heated to reflux. 0.2 mols (14 cm.³) of glycol bromohydrin is added little by little and kept at reflux for an hour and a half. After cooling the mixture is acidified, using 12 cm.³ of hydrochloric acid to destroy the excess calcium carbonate, and brought to an alkaline pH, using ammonia. Since it is difficult to substitute a hydrogen of the amine function in the ortho position of the nitro group, this process always yields a mixture of the product sought and 1-amino-2-nitro-(2'-hydroxyethyl)-4-methylaminobenzene.

These two products are separated in the following manner: The resulting mixture is dried to yield 4.5 g. of a product which melts at 110° C. and consists almost entirely of the monohydroxyethylated derivative. After several recrystallizations, 3 g. of pure 1-amino-2-nitro-(2'-hydroxyethyl)-4-methylaminobenzene which melts at 114° C., is obtained. The isomer (2'-hydroxyethyl)-1-amino-2-nitro-4-methylaminobenzene melts at 120° C. and the mixture of these two isomers melts at 100° C.

Analysis of the mono-hydroxyethylated product obtained.—Calculated (percent): C, 51.18; H, 6.16; N, 19.90. Found (percent): C, 50.89–50.98; H, 6.16–6.43; N, 20.21–20.23.

This mono-hydroxyethylated product may also be used as a hair dye.

In order to obtain the di-hydroxyethylated product after the above drying step, the mother liquor is extracted, using methyl-isobutyl-ketone and vacuum concentrated. After cooling, the yield is 3.8 g. of a raw product which melts at 80° C. and the major part of which consists of the di-hydroxyethylated derivative. After recrystallization in ethyl acetate, 2.7 g. of (2'-hydroxyethyl)-amino-2-nitro-(2'-hydroxyethyl)-4-methylaminobenzene which melts at 99° C. is obtained by drying.

(2) SECOND METHOD OF PREPARING (2'-HYDROXYETHYL) - 1 - AMINO - 2 - NITRO-(2'-HYDROXYETHYL)-4-METHYLAMINOBENZENE

This process is carried out in four steps:

(a) Preparation of the β-chloroethylic ester of (2-nitro-4-methylacetamino)-phenylcarbamic acid 0.17 mols (35 g.) of 1-amino-2-nitro-4-methylacetaminobenzene are dissolved in 200 cm.$^3$ of methyl-isobutyl-ketone. After adding 12 g. of calcium carbonate 0.2 mols (28.8 g.) of chloroethylchloroformiate is introduced little by little, at reflux and while stirring. Reflux is maintained for three hours. The product is filtered while boiling to eliminate mineral salts. The solvent is driven off under vacuum and the oily residue is treated with ether to crystallize it. Drying yields 44 g. of the β-chloroethylic ester of (2-nitro-4-methylacetamino)-phenylcarbamic acid, which melts at 83° C.

Analysis of the end product.— Calculated (percent): C, 45.64; H, 4.43; N, 13.31. Found (percent): C, 45.46–45.55; H, 4.62–4.50; N, 13.16–13.32.

(b) Preparation of the β-chloroethylic ester of (2-nitro-4-methylamino)-phenylcarbamic acid 0.232 mols (73.3 g.) of the β-chloroethylic ester of (2-nitro-4-methylacetamino)-phenylcarbamic acid are introduced into a mixture containing 79 cm.$^3$ of concentrated hydrochloric acid, 158 cm.$^3$ of water and 43 cm.$^3$ of acetic acid. This is brought to reflux for an hour, cooled in a mixture of ice and salt and yields 58 g. of crystallized hydrochlorate on drying. The hydrochlorate is dissolved in water, brought to an alkaline pH with ammonia, and 49 g. of the β-chloroethylic ester of (2-nitro-4-methylamino)-phenylcarbamic acid is obtained on drying. This ester melts at 90° C.

Analysis of end product.—Calculated (percent): C, 43.87; H, 4.38; N, 15.35. Found (percent): C, 44.13–44.01; H, 4.56–4.48; N, 15.63–15.05.

(c) Preparation of (2'-hydroxyethyl)-1-amino-2-nitro-4-methylaminobenzene 0.056 mols (15.5 g.) of the β-chloroethylic ester of (2-nitro-4-methylamino)-phenylcarbamic acid is heated to reflux for two hours in 140 cm.$^3$ of an alcoholic potash solution containing 110 g. of potash per liter. This is cooled, emptied into a liter of ice water and dried to yield 9.5 g. of (2'-hydroxyethyl)-1-amino-2-nitro - 4 - methylaminobenzene which melts at 120° C.

Analysis of end product.—Calculated (percent): C, 51.18; H, 6.16; N, 22.74. Found (percent): C, 51.39–51.31; H, 6.39–6.30; N, 22.54–22.62.

(d) Preparation of (2'-hydroxyethyl)-1-amino-2-nitro-(2'-hydroxyethyl)-4-methylaminobenzene The substitution of a hydrogen of the amine function in the meta position of the nitro group is easily accomplished in the following manner. A mixture of 0.086 mols (18.1 g.) of (2'-hydroxyethyl)-1-amino-2-nitro - 4 - methylaminobenzene with 110 cm.$^3$ of water and 6.25 g. of calcium carbonate is brought to reflux. 0.124 mols (8.75 cm.$^3$) of glycol bromohydrin is then introduced drop by drop, while stirring. Reflux is maintained for an hour and a half and then the reaction mixture is cooled and acidified with hydrochloric acid. The crystallized hydrochlorate is then dried, redissolved in water, and brought to an alkaline pH by adding ammonia. Drying yields 16 g. of (2'-hydroxyethyl)-1-amino-2-nitro - (2'-hydroxyethyl)-4-methylaminobenzene which melts at 99° C.

Analysis of end product.—Calculated (percent): C, 51.76; H, 6.66; N, 16.47. Found (percent): C, 51.64–51.90; H, 6.83–6.85; N, 16.34–16.57.

Several examples showing how the dye according to the invention may be used to color the hair will now be given.

Example 1.—The following solution is prepared:

| | G. |
|---|---|
| (2' - hydroxyethyl) - 1 - amino-2-nitro-(2'-hydroxyethyl)-4-methylaminobenzene | 0.5 |
| Lauric alcohol oxyethylenated with 20 molecules of ethylene oxide | 5 |
| Ammonia q.s.p., pH 9. | |
| Water q.s.p. | 100 |

This solution is applied to completely white hair and left for ten minutes. The hair is then rinsed, washed, and dried, and the shade obtained is mauve.

Example 2.—The following solution is prepared:

| | G. |
|---|---|
| (2' - hydroxyethyl) - 1 - amino-2-nitro-(2'-hydroxyethyl)-4-methylaminobenzene | 0.7 |
| 1-hydroxy-2-amino-5-nitrobenzene | 0.12 |
| Sodium salt of N-(N',N'-diethylaminopropyl)-N$^2$-fatty alkyl-asparagine having the formula: | |

$$\text{R—NH—CH—COONa} \quad \overset{\text{CH}_2\text{—CONH—(CH}_2)_3\text{—N}}{\underset{}{}} \begin{matrix} \text{C}_2\text{H}_5 \\ \text{C}_2\text{H}_5 \end{matrix}$$

| | |
|---|---|
| in which R is the alkyl residue of the fatty acids of copra | 1 |
| 50% solution of sodium salt of N(N',N'-diethylaminopropyl) - N$_2$-fatty alkyl-asparagine having the formula: | |

$$\text{R—NH—CH—COONa} \quad \overset{\text{CH}_2\text{—CONH—(CH}_2)_3\text{—N}}{\underset{}{}} \begin{matrix} \text{C}_2\text{H}_5 \\ \text{C}_2\text{H}_5 \end{matrix}$$

| | |
|---|---|
| in which R represents the alkyl residue of the fatty acids of tallow | 1 |
| Lauric alcohol oxyethylenated with 20 molecules of ethylene oxide | 3 |
| Diethanolamide of copra | 2 |
| Ammonia q.s.p., pH 9. | |
| Water q.s.p. | 100 |

This solution is applied to 90% white hair for 20 minutes. The hair is then rinsed and washed. After drying, a clear chestnut is obtained.

Example 3.—The following solution is prepared:

| | G. |
|---|---|
| (2' - hydroxyethyl) - 1 - amino-2-nitro-(2'-hydroxyethyl)-4-methylaminobenzene | 0.6 |
| 1-hydroxy-2-amino-5-nitrobenzene | 0.1 |
| Nitroparaphenylenediamine | 0.01 |
| 1-amino-2-nitro-4-methylaminobenzene | 0.07 |
| Sodium salt of N(N',N'-diethylaminopropyl)-N$^2$- | | alkyl-asparagine having the formula:

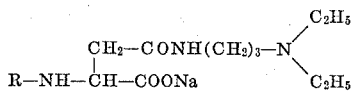

in which R is the alkyl residue of the fatty acids of copra _____ 1

50% solution of the sodium salt of N(N',N'-diethyl-aminopropyl) - N₂ - alkyl-asparagine having the formula:

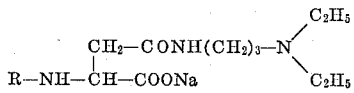

in which R represents the alkyl residue of the fatty acids of tallow _____ 1
Lauric alcohol oxyethylenated with 20 molecules of ethylene oxide _____ 3
Diethanolamide of copra _____ 2
Ammonia q.s.p., pH 9.
Water q.s.p. _____ 100

This solution is applied to 90% white hair for twenty minutes. The hair is then rinsed and washed. After drying, a reddish chestnut is obtained.

What is claimed is:

1. A composition for dyeing keratinic fibers comprising an aqueous solution containing dyeing amounts of the compound, (2' - hydroxyethyl) - 1-amino-2-nitro-(2'-hydroxyethyl)-4-methylaminobenzene.

2. The dyeing composition of claim 1 having a pH between 8 and 9.5.

3. The dyeing composition of claim 1 in which the concentration of said compound falls in the range between 0.1% and 3%.

4. The method of dyeing human hair which comprises the step of applying thereto an aqueous composition containing dyeing amounts of (2'-hydroxyethyl)-1-amino-2-nitro-(2'-hydroxyethyl)-4-methylaminobenzene having a pH between 7 and 10.

References Cited

UNITED STATES PATENTS

| 2,750,326 | 6/1956 | Eckardt | 167—88 |
| 2,750,327 | 6/1956 | Eckardt | 167—88 |
| 3,274,249 | 9/1966 | Brunner et al. | 260—573 |
| 3,194,838 | 7/1965 | Ross | 260—573 |

FOREIGN PATENTS

| 13,956 | 4/1905 | Great Britain | 260—573 |
| 505,323 | 8/1930 | Germany | 260—573 |
| 1,137,922 | 1/1957 | France | 8—10.1 |

ALBERT T. MEYERS, Primary Examiner

V. C. CLARKE, Assistant Examiner

U.S. Cl. X.R.

8—10, 85, 87, 93; 260—573